Feb. 10, 1959 R. G. HARTENSTEIN ET AL 2,873,109
VIBRATION ISOLATING MOUNTS
Filed Jan. 23, 1956 2 Sheets-Sheet 1

WITNESSES
Robert C. Baird
T. H. Murray

INVENTORS
Raymond G. Hartenstein &
and James J. Kerley, Jr.
BY
F. E. Browder
ATTORNEY

United States Patent Office 2,873,109
Patented Feb. 10, 1959

2,873,109

VIBRATION ISOLATING MOUNTS

Raymond G. Hartenstein, Ferndale, and James J. Kerley, Jr., Cheverly, Md., assignors to Westinghouse Electric Corporation, East Pittsburgh, Pa., a corporation of Pennsylvania Application January 23, 1956, Serial No. 560,481

5 Claims. (Cl. 267—1)

This invention relates to an article of manufacture adapted for use in damping transmission of vibration and shock between two bodies.

In a copending application Serial No. 554,889, filed December 22, 1955, and assigned to the assignee of the present application, there is described a novel type of vibration isolation mount which is capable of isolating shock and vibration in three planes. That mount comprises, essentially, a plurality of flexible cables embedded in a sheet of elastic material, such as rubber or plastic. The opposite ends of the aforesaid cables are attached to the members which are to be isolated in a manner such that the assembly forms a quadrant of a cylinder (i. e. it makes a right angle bend).

Although the mount shown and described in the aforesaid application Serial No. 554,889, will perform satisfactorily for its intended purpose, it was found to be impractical to a certain extent because of certain inherent structural limitations. One of these limitations was due to the fact that the aforesaid elastic sheets were fastened to the bodies to be isolated by friction screws or other similar fastening means. Since the elastic sheet would yield under the pressure of the friction screws when tightened, it would permit the screws to loosen when the assembly was subjected to vibration; and, thus, the screws had to be tightened from time to time.

Accordingly, it is an object of this invention to provide a new and improved mount capable of isolating shock and vibration in all three planes and suitable for practical commercial purposes.

Another object of the invention lies in the provision of a vibration and shock isolating mount which is economical in size and weight for a given loading condition. Due to the bending moment of a mount of the type described above, it is desirable to keep the mount thin at the middle and at its extreme edges for high frequency vibrations, while it is desirable to make the mount thicker at the edges to restrain motion at resonance. The variation in thickness should be gradual to keep stress concentrations at a minimum under shock loading conditions. As will become apparent from the following description, these desirable characteristics are combined in the mount of the present invention by employing projections which extend outwardly over the edges of the elastic sheet of the mount.

Other objects and features of the invention will become apparent from the following detailed description taken in connection with the accompanying drawings which form a part of this specification and in which.

Figure 5:
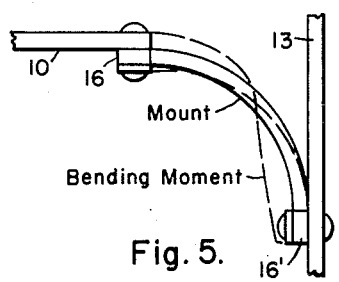
Figure 12:
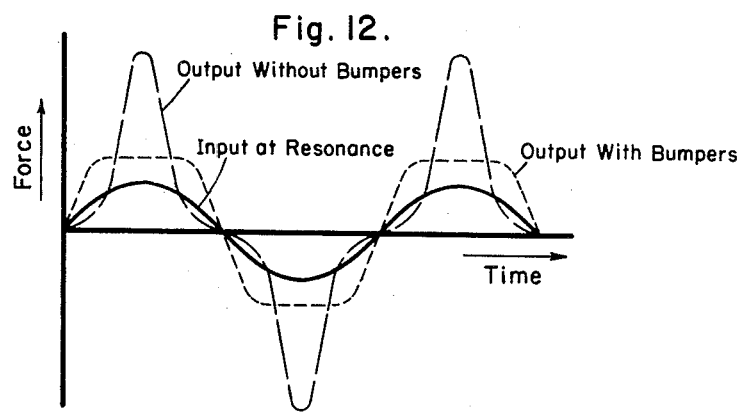

Fig. 5 graphically illustrates the bending moments produced in the isolator mount;

Figs. 6 through 11 illustrate various embodiments of the bumper attachment for the mount, said bumper being used to greatly improve the characteristics of the mount over a wide range of frequencies; and Fig. 12 is a graphic illustration of the performance of the mount with the bumpers added.

Figure 1:
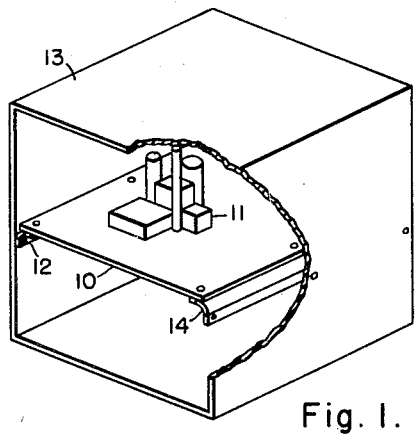
Fig. 1 is a view illustrating a typical assembly employing the shock and vibration isolator of the invention.

Referring to Fig. 1, the assembly shown comprises a platform 10 on which are mounted weights 11 which represent electronic or other equipment. The platform 10 is connected to a chassis 13 through two vibration isolation mounts 12 and 14. Each of these mounts comprises a series of parallel flexible cables embedded in a sheet of elastic material such as rubber, the mount being bent at its center to form a quadrant of a cylinder. As is fully explained in copending application Serial No. 554,889, filed December 22, 1955, the mounts give exceptionally good vibration isolation in all three planes.

Figure 2:
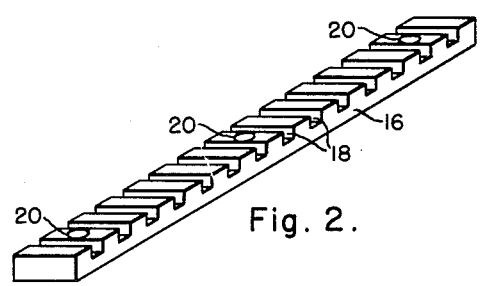
Fig. 2 is a view of the comb attachment for the mount shown in Fig. 1.
Figure 3:
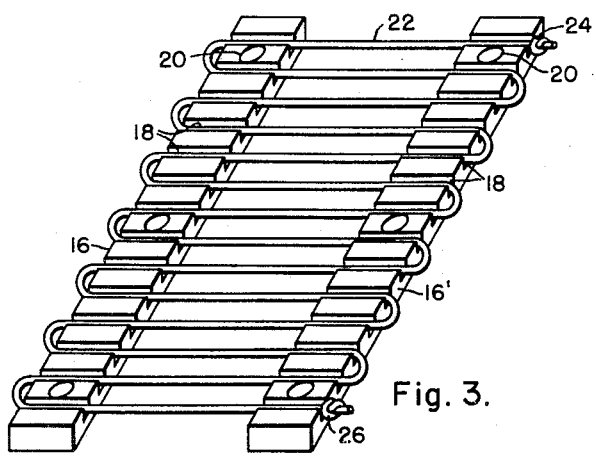
Fig. 3 is a view illustrating the cable construction of the mount.

Components of the improved vibration and shock isolating mount of the present invention are shown in Figs. 2 and 3 and include a pair of comb supporting members 16 and 16'. The combs comprise elongated bars of metal or other suitable material in which are machined transverse slots 18. A series of mounting holes 20 are provided in the comb to facilitate fastening to the chassis 13 and the mounting plate 10. Extending through slots 18, and woven between the combs 16 and 16' (Fig. 3), is a continuous flexible cable 22. The cable is wrapped around the ends of the slots and is soldered to one or the other of the combs at its ends 24 and 26. With this configuration, the combs obviously cannot pull apart.

Figure 4:
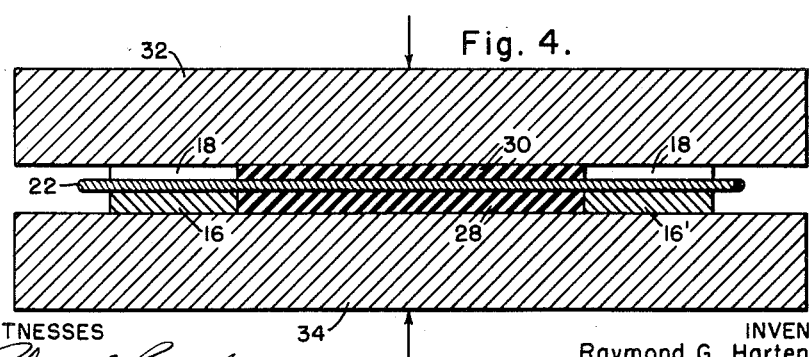
Fig. 4 illustrates the method of fabricating the mount of the invention.

As is shown in Fig. 4, two sheets 28 and 30 of rubber or other elastic material are placed on the top and bottom of cable 22 and are cemented together or vulcanized under the pressure of dies 32 and 34. The resulting product is a sheet of elastic material embedded with the continuous flexible cable 22. The two combs 16 and 16' can thus be fastened securely to the bodies which are to be isolated (plate 10 and chassis 13) with the assurance that the screws or other elements extending through holes 20 will not loosen under severe vibrations.

Figure 6:
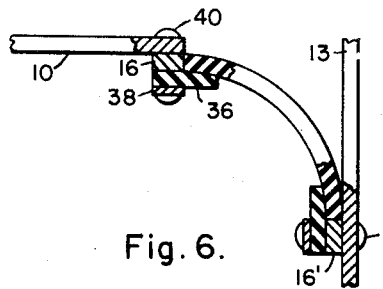
Figure 7:
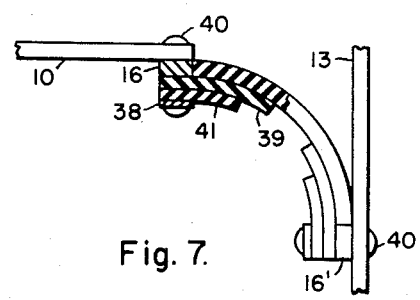
Figure 8:
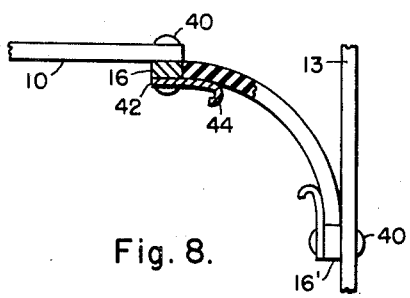
Figure 9:
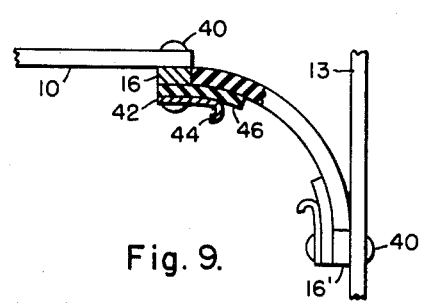
Figure 10:
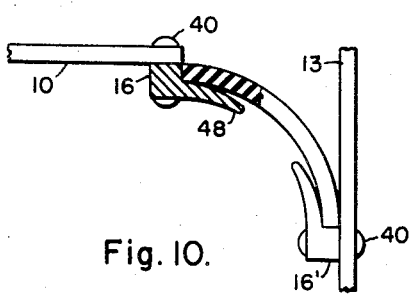
Figure 11:
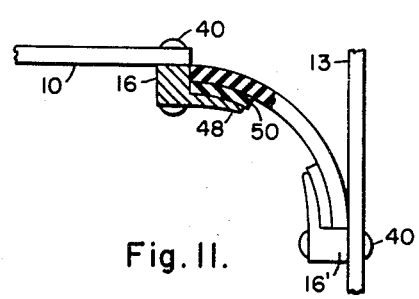

In Fig. 5, it can be seen that the bending moment of the mount increases from a minimum at its center to a maximum at its outer edges. It is conceivable that a mount could be manufactured having a cross-section conforming to that of the bending moment to obtain a lightweight and economical structure. Such a mount would function satisfactorily at low frequencies where bending is experienced, but the mount would be quite noisy at high frequencies due to its non-uniform cross-section. To facilitate the high bending moments at the resonant frequency and low bending moments at higher frequencies, the bumper attachment shown in Figs. 6–11 was developed. In Fig. 6 the bumper comprises an elongated elastic projection 36 which extends out over the surface of the isolator in combination with a metal plate 38 which, together with bolts or rivets 40, holds the comb 16 and projection 36 against the plate 10 or chassis 13. In Fig. 7 a second, shorter projection of elastic material 41 is included with a longer elastic projection 39 to give the structure added strength. In Fig. 8, the projection comprises a sheet of metal 42 having its outer edge bent to form a lip 44. A sheet of elastic material 46 is combined with the lip configuration in Fig. 9. In Fig. 10 the lip 48 is an integral part of the comb 16 or 16', and in Fig. 11 a sheet of elastic material 50 is placed underneath the lip 48. Other and further configurations may, of course, be used depending upon requirements. The configuration which is most suitable for a particular application may best be determined by experiment.

At high frequencies (above resonance) there is no intimate shear contact between the elastic sheet of the mount and the bumpers. Consequently, the effective thickness of the sheet at these higher frequencies is kept constant. At the resonant frequency and under shock, bending starts in the isolator. The isolator immediately intercepts the bumper which (1) changes the fundamental frequency of the mount, (2) physically restrains the motion of the mount, (3) absorbs energy due to friction between the mount and bumper, and (4) eliminates stress concentrations at the ends of the isolator. In addition, forces transmitted through the mount are greatly reduced by the addition of the bumpers as shown in Fig. 12. All of this is accomplished without introducing any high frequency noise of any kind in any plane.

The present invention thus provides an improved, economical vibration and shock isolating mount which is capable of isolating vibration and shock in all three planes.

Although the invention has been described in connection with certain specific embodiments, it should be readily apparent to those skilled in the art that various changes in form and arrangement of parts can be made to suit requirements without departing from the spirit and scope of the invention.

We claim as our invention:

1. An article of manufacture adapted for use in damping transmission of vibration and shock between two bodies and comprising a pair of parallel elongated members each having a series of spaced projections on one face thereof, a continuous cable wrapped around said projections and woven between said members, elastic material surrounding said cables to form a composite elastic sheet embedded with woven cable, means for securing each of said members to an associated one of said bodies, and projections extending from said members outwardly over the surface of said elastic sheet.

2. An article of manufacture adapted for use in damping transmission of vibration and shock between two bodies and comprising a pair of elongated members each having a series of slots formed therein perpendicular to the long transverse dimension of said members, a continuous flexible metal element wrapped around said slots and woven between said members, elastic material surrounding said element to form a composite elastic sheet embedded with said woven element, and projections extending from said member outwardly over the surface of said elastic sheet.

3. An article of manufacture adapted for use in damping transmission of vibration and shock between two bodies and comprising a pair of parallel elongated members each having a series of spaced projections on one face thereof, a continuous flexible element wrapped around said projections and woven between said members, elastic material surrounding said element to form a composite elastic sheet embedded with said woven element, and projections extending from said members outwardly over the surface of said elastic sheet.

4. An article of manufacture adapted for use in damping transmission of vibration and shock from one body to another and comprising a pair of parallel elongated members, projections on said members, a continuous flexible element woven between said projections, elastic material surrounding said element to form a composite elastic sheet embedded with said woven element, and projections extending from said members outwardly over the surface of said elastic sheet.

5. An article of manufacture adapted for use in damping transmission of vibration and shock from one body to another and comprising a pair of parallel elongated members adapted for attachment to the two bodies, respectively, projections on said members, a continuous flexible cable woven between said projections and forming a plurality of longitudinally-spaced-apart cable sections extending transversely between said members, and elastic material surrounding each of said cable sections to form a composite elastic sheet embedded with said woven cable and anchored through the medium of same to said members.

References Cited in the file of this patent

UNITED STATES PATENTS

| | | |
|---|---|---|
| 1,483,561 | Ungar | Feb. 12, 1924 |
| 1,619,457 | Bell | Mar. 1, 1927 |
| 1,671,764 | Dickey | May 29, 1928 |
| 1,709,207 | Gammeter | Apr. 16, 1929 |
| 2,139,840 | McCone | Dec. 13, 1938 |
| 2,578,885 | Huff | Dec. 18, 1951 |
| 2,643,529 | Thomas | June 30, 1953 |